(12) United States Patent
Koppel et al.

(10) Patent No.: US 12,160,057 B2
(45) Date of Patent: Dec. 3, 2024

(54) BATTERY SYSTEM FOR AN ELECTRIC VEHICLE

(71) Applicant: SAMSUNG SDI CO., LTD., Yongin-si (KR)

(72) Inventors: Andreas Koppel, Haselsdorf-Tobelbad (AT); Fritz Haring, Bruck an der Mur (AT); Michael Bauer, Feldkirchen bei Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 183 days.

(21) Appl. No.: 17/888,652

(22) Filed: Aug. 16, 2022

(65) Prior Publication Data
US 2023/0057108 A1 Feb. 23, 2023

(30) Foreign Application Priority Data

Aug. 17, 2021 (EP) ..................................... 21191693
Aug. 11, 2022 (KR) ......................... 10-2022-0100758

(51) Int. Cl.
*H01R 11/28* (2006.01)
*H01R 4/70* (2006.01)
(Continued)

(52) U.S. Cl.
CPC ............. *H01R 11/281* (2013.01); *H01R 4/70* (2013.01); *H01R 13/447* (2013.01);
(Continued)

(58) Field of Classification Search
None
See application file for complete search history.

(56) References Cited

U.S. PATENT DOCUMENTS

| | | |
|---|---|---|
| 3,601,758 A | 8/1971 | Davidsson |
| 2009/0111010 A1* | 4/2009 | Okada ............... H01M 10/6563 429/120 |

(Continued)

FOREIGN PATENT DOCUMENTS

| | | | | |
|---|---|---|---|---|
| DE | 102015011895 A1 * | 4/2016 | .......... | H01M 10/658 |
| DE | 102014017081 A1 | 5/2016 | | |

(Continued)

OTHER PUBLICATIONS https://www.evfiresafe.com/what-is-an-ev-battery#:~:text=An%20EV%20traction%20battery%20is,EVs%20high%20performance%20%26%20rapid%20acceleration. Copyright EV FireSafe 2021.*

(Continued)

*Primary Examiner* — Krystal Robinson
(74) *Attorney, Agent, or Firm* — Lee IP Law, P.C.

(57) ABSTRACT

A battery system for an electric vehicle, the battery system includes at least one high voltage component; and a touch protector, the touch protector being configured to protect a user from accidentally contacting the high voltage component, wherein the touch protector includes a pivotably mounted isolating flap, the isolating flap being pivotable between a blocking position in which the isolating flap blocks access to the at least one high voltage component, and an access position in which the isolating flap allows access to the at least one high voltage component, wherein the isolating flap is configured such that the isolating flap is pivotable towards the high voltage component from the blocking position to the access position in response to application of a predetermined force to the isolating flap.

18 Claims, 2 Drawing Sheets

(51) Int. Cl.
*H01R 13/447* (2006.01)
*H01M 50/543* (2021.01)
(52) U.S. Cl.
CPC ...... *H01M 50/543* (2021.01); *H01M 2220/20* (2013.01); *H01R 2201/26* (2013.01)

(56) References Cited

U.S. PATENT DOCUMENTS

| | | | | |
|---|---|---|---|---|
| 2011/0101920 A1* | 5/2011 | Seo | ........................ | H02J 7/005 |
| | | | | 429/61 |
| 2011/0177379 A1* | 7/2011 | Maguire | ............. | H01M 10/613 |
| | | | | 429/154 |
| 2013/0258607 A1 | 10/2013 | Rathmacher | | |
| 2014/0285022 A1* | 9/2014 | Dao | .................... | H01M 10/441 |
| | | | | 307/66 |
| 2018/0123097 A1 | 5/2018 | Jo et al. | | |
| 2018/0375227 A1 | 12/2018 | Kaehny et al. | | |

FOREIGN PATENT DOCUMENTS

| | | |
|---|---|---|
| DE | 102018205951 A1 | 10/2019 |
| DE | 102019128434 B3 | 12/2020 |
| EP | 3419119 A1 | 12/2018 |

OTHER PUBLICATIONS

EP 21191693.7 Extended European Search Report dated Jan. 28, 2022.

\* cited by examiner

BATTERY SYSTEM FOR AN ELECTRIC VEHICLE

CROSS-REFERENCE TO RELATED APPLICATIONS

This application claims priority to and the benefit of European Patent Application No. 21191693.7, filed on Aug. 17, 2021, in the European Intellectual Property Office, and Korean Patent Application No. 10-2022-0100758, filed in the Korean Intellectual Property Office on Aug. 11, 2022, the entire contents of which are incorporated herein by reference.

BACKGROUND

1. Field

Embodiments relate to a battery system for an electric vehicle.

2. Description of the Related Art

In recent years, vehicles for transportation of goods and peoples have been developed using electric power as a source for motion. Such an electric vehicle is an automobile that is propelled by an electric motor, using energy stored in rechargeable batteries. An electric vehicle may be solely powered by batteries or may be a form of hybrid vehicle powered by, e.g., a gasoline generator. Furthermore, the vehicle may include a combination of electric motor and conventional combustion engine. In general, an electric-vehicle battery, EVB, or traction battery is a battery used to power the propulsion of battery electric vehicles, BEVs. Electric-vehicle batteries differ from starting, lighting, and ignition batteries because they are designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries may include an electrode assembly including a positive electrode, a negative electrode, and a separator interposed between the positive and negative electrodes, a case receiving the electrode assembly, and an electrode terminal electrically connected to the electrode assembly. An electrolyte solution may be injected into the case in order to facilitate charging and discharging of the battery via an electrochemical reaction of the positive electrode, the negative electrode, and the electrolyte solution. The shape of the case, e.g., cylindrical or rectangular, may depend on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled in series and/or in parallel so as to provide a high energy density, e.g., for motor driving of a hybrid vehicle. The battery module may be formed by interconnecting the electrode terminals of the plurality of unit battery cells depending on a desired amount of power and in order to realize a high-power rechargeable battery.

Battery modules may be constructed either in block design or in modular design. In block designs each battery may be coupled to a common current collector structure and a common battery management system and the unit thereof is arranged in a housing. In modular designs, pluralities of battery cells may be connected to form submodules and several submodules are connected to form the battery module. In automotive applications, battery systems may include a plurality of battery modules connected in series for providing a desired voltage. Therein, the battery modules may include submodules with a plurality of stacked battery cells, each stack including cells connected in parallel that are connected in series (XpYs) or cells connected in series that are connected in parallel (XsYp).

A battery pack may be a set of any number of (e.g., identical) battery modules. They may be configured in a series, parallel or a mixture of both to deliver the desired voltage, capacity, or power density. Components of battery packs may include the individual battery modules, and the interconnects, which provide electrical conductivity between them.

For meeting the dynamic power demands of various electrical consumers connected to the battery system a static control of battery power output and charging may not be sufficient. Steady exchange of information between the battery system and the controllers of the electrical consumers may be used. This information may include the battery systems actual state of charge, SoC, potential electrical performance, charging ability and internal resistance as well as actual or predicted power demands or surpluses of the consumers. Therefore, battery systems may include a battery management system, BMS, for obtaining and processing such information on system level and further a plurality of battery module managers, BMMs, which are part of the system's battery modules and obtain and process relevant information on module level. The BMS may measure the system voltage, the system current, the local temperature at different places inside the system housing, and the insulation resistance between live components and the system housing. Additionally, the BMMs may measure the individual cell voltages and temperatures of the battery cells in a battery module.

The BMS/BMM may be provided for managing the battery pack, e.g., by protecting the battery from operating outside its safe operating area, monitoring its state, calculating secondary data, reporting that data, controlling its environment, authenticating it and/or balancing it.

In case of an abnormal operation state, a battery pack may be disconnected from a load connected to a terminal of the battery pack. Battery systems may further include a battery disconnect unit, BDU, that is electrically connected between the battery module and battery system terminals. The BDU may be the primary interface between the battery pack and the electrical system of the vehicle. The BDU may include electromechanical switches that open or close high current paths between the battery pack and the electrical system. The BDU may provide feedback to the battery control unit, BCU, accompanied to the battery modules such as voltage and current measurements. The BCU may control the switches in the BDU using low current paths based on the feedback received from the BDU. The main functions of the BDU may thus include controlling current flow between the battery pack and the electrical system and current sensing.

The BDU may further manage additional functions like external charging and pre-charging.

SUMMARY

The embodiments may be realized by providing a battery system for an electric vehicle, the battery system including at least one high voltage component; and a touch protector, the touch protector being configured to protect a user from accidentally contacting the at least one high voltage component, wherein the touch protector includes a pivotably mounted isolating flap, the isolating flap being pivotable between a blocking position in which the isolating flap blocks access to the at least one high voltage component, and an access position in which the isolating flap allows access to the at least one high voltage component, and wherein the isolating flap is configured such that the isolating flap is pivotable towards the at least one high voltage component from the blocking position to the access position in response to application of a predetermined force to the isolating flap.

The isolating flap may be preloaded in the blocking position.

The predetermined force may be a force of more than 1 N.

The battery system may further include an isolator, wherein the isolating flap is integrally mounted on the isolator.

The battery system may further include an integral hinge, wherein the isolating flap is mounted on the isolator via the integral hinge.

The isolator may include an access opening that is covered by the isolating flap when the isolating flap is in the blocking position, and uncovered by the isolating flap when the isolating flap is in the access position.

The access opening may be an opening configured to accommodate insertion of a force applicator.

The battery system may include a high voltage traction battery for the electric vehicle.

The embodiments may be realized by providing an electric vehicle comprising the battery system according to an embodiment.

The isolating flap may be preloaded in the blocking position.

The predetermined force may be a force of more than 1 N.

The battery system may further include an isolator, wherein the isolating flap is integrally mounted on the isolator.

The battery system may further include an integral hinge, wherein the isolating flap is mounted on the isolator via the integral hinge.

The isolator may include an access opening that is covered by the isolating flap when the isolating flap is in the blocking position, and uncovered by the isolating flap when the isolating flap is in the access position.

The access opening may be an opening configured to accommodate insertion of a force applicator.

The battery system may include a high voltage traction battery for the electric vehicle.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
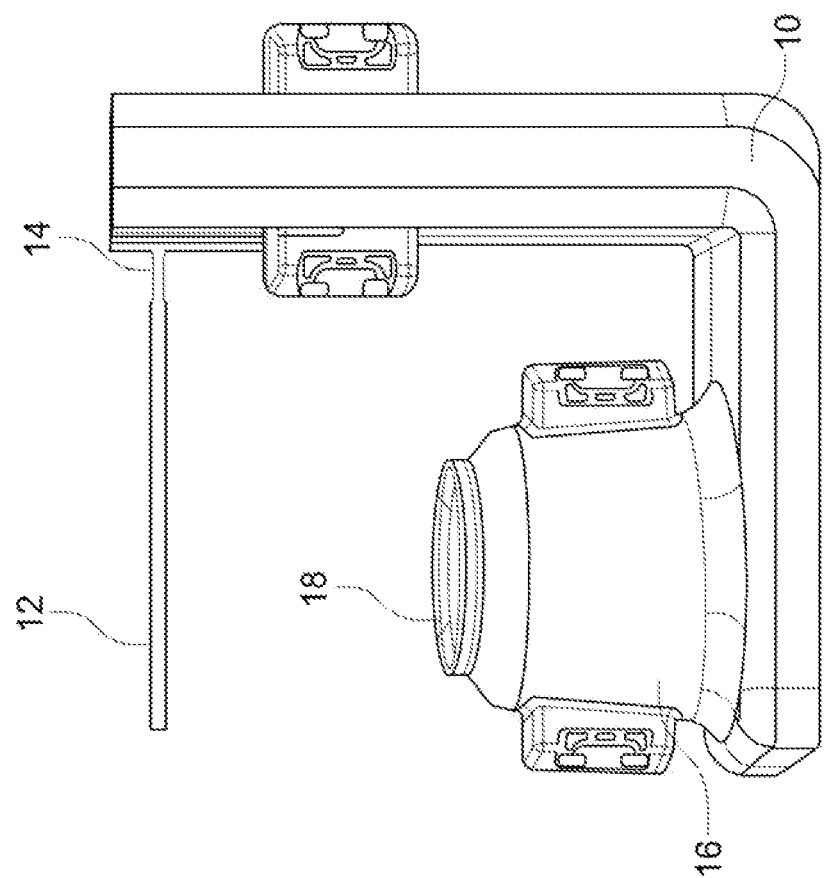
FIG. 1 illustrates an isolating flap according to an embodiment and an isolator carrying the isolating flap, the isolating flap being in the blocking position.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Accordingly, processes, elements, and techniques that are not considered necessary to those having ordinary skill in the art for a complete understanding of the aspects and features of the present disclosure may not be described.

As used herein, the terms "or" and "and/or" are not exclusive terms, and include any and all combinations of one or more of the associated listed items. Further, the use of "may" when describing embodiments of the present disclosure refers to "one or more embodiments of the present disclosure." In the following description of embodiments of the present disclosure, the terms of a singular form may include plural forms unless the context clearly indicates otherwise. Expressions such as "at least one of," when preceding a list of elements, modify the entire list of elements and do not modify the individual elements of the list.

As used herein, the term "substantially," "about," and similar terms may be used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

A battery system may include a high voltage battery, e.g., a high voltage traction battery of the electric vehicle which serves to propel the electric vehicle. The high voltage battery itself or a component in electrical contact with the battery may be understood as a high voltage component. Such high voltage components may be isolated to not endanger a user while at least some of these high voltage components may need to be accessible, e.g., for maintenance. A touch protector according to an embodiment may facilitate such access, and may also help prevent the user from accidentally contacting the high voltage component, e.g., with the finger of a hand.

This may be achieved via an isolating flap that, in a blocking position, may help prevent accidental contact by preventing access to the high voltage component, e.g., by covering the high voltage component. In the blocking position, access to the high voltage component may be blocked at least in so far that no accidental contact may occur. In an implementation, the isolating flap may be adapted to withstand, in the blocking position, forces acting to pivot the isolating flap towards the access position in a magnitude that could usually occur when the isolating flap is accidentally touched by the finger or hand of a person. If, however, a sufficiently high force is applied to the isolating flap in the blocking position, the isolating flap may pivot into the access position, thereby facilitating access to the high voltage component. Thereby, according to an embodiment, the isolating flap may pivot towards the high voltage component, rather than away from it. In an implementation, a distance between the isolating flap and the high voltage component may be reduced via the movement so that in the access position at least parts of the isolating flap are closer to the high voltage component than in the blocking position. In an implementation, the isolating flap may be pivoted towards the high voltage component, e.g., using a tool, to move the isolating flap from the blocking position into the access position. The isolating flap may work as an electrically insulating member, e.g., may be made of an electrically non-conductive material.

The isolating flap may have a number of advantages. First of all, the isolating flap may allow an easy access to the high voltage component while still allowing for sufficient protection against accidental contact. In contrast to separate or loose touch protection elements, the isolating flap according to an embodiment may not need to be removed from the high voltage component to allow access to the high voltage component. To the contrary, the mounted isolating flap may always remain in connection to the part it is mounted to, e.g., an isolator arranged at or near the high voltage component, only pivoting away so as to allow access to the high voltage component. This allows for easier access to the high voltage component and also prevents accidental loss of the touch protector. Manual removal of the touch protector may be unnecessary, which may help reduce the effort of service and documentation. Further, the isolating flap may be configured to fulfill not only the IPXXB but also higher standards, e.g., the IPXXD standard, which raises the safety level. In an implementation, the isolating flap may pivot towards the high voltage component, rather than away from it, when being moved from the blocking position into the access position, and the battery system according to an embodiment may be less complex and less error-prone.

According to an embodiment, the isolating flap may be preloaded into the blocking position. For example, the isolating flap may be biased to return to or remain in the blocking position when no force is applied to the isolating flap, e.g., in a resting state (or normal operation state of the battery system). Due to the preloading, the isolating flap may always move back to the blocking position after being pivoted out of that position. When a force applied to the isolating flap is no longer sufficiently high to pivot the isolating flap into the access position, e.g., because the tool has been removed, the isolating flap may snap back into the blocking position. In an implementation, the isolating flap may be preloaded into the blocking position with a force of more than 1 N. In an implementation, the isolating flap may be adapted such that the isolating flap may pivot from the blocking position into the access position (towards the high voltage component) only if a force of more than 1 N is applied to the isolating flap at a right angle. Thus, according to an embodiment, a force of more than 1 N may need to be applied at a right angle to the isolating flap to pivot the isolating flap from the blocking position to the access position. This force may be exerted by a force applying tool, e.g., a screw driver. The force applying tool may thus reach the high voltage component by pivoting the isolating flap towards the high voltage component into the access position. The isolating flap having a resistance against such a force may be sufficient to prevent accidental contact of a user with the high voltage component. Such a resistance may be sufficient to fulfil the IPXXD requirements.

According to an embodiment, the isolating flap may be integrally mounted to an isolator. The isolating flap being integrally mounted to the isolator may be understood as the isolating flap being captively or undetachably mounted to the isolator, at least with respect to non-destructive forces. Such a connection with the isolator may be particularly secure and may help sufficiently prevent accidental detachment. According to an embodiment, the isolating flap may be mounted to the isolator via an integral hinge, the integral hinge, e.g., a flexure bearing, or a living hinge in the sense of a thin flexible hinge made from the same material as the two pieces it connects. Thus, the isolator and the isolating flap may be undetachable parts of the same element, and may, e.g., be made of the same material. The term "mounted" in this regard may be understood as "connected to". Such a connection between the isolating flap and the isolator may be particularly secure as it may further lower the risk of losing the touch protector during service or maintenance. The isolator may isolate the high voltage component. It may form a carrying part for carrying, e.g., supporting, the isolating flap.

According to an embodiment, the isolator isolating the high voltage component may include an access opening that is covered or protected by the isolating flap in the blocking position and uncovered in the access position. The isolator may isolate the high voltage component with respect to its surroundings, thereby providing electrical insulation. The high voltage component may be accessible via the access opening, e.g., for maintenance. This access opening may be covered by the isolating flap so as to protect a user from accidentally coming into contact with the high voltage component thorough the access opening. The isolating flap may be pivotably mounted to the isolator, the isolator working as a carrying part. Such an access opening may be covered particularly simply and securely with the isolating flap according to an embodiment. According to an embodiment, the access opening may be an opening for inserting a force applying instrument, e.g., a screwdriver. The opening may thus have an opening width allowing for the respective instrument to be inserted and to access the high voltage component.

Figure 2:
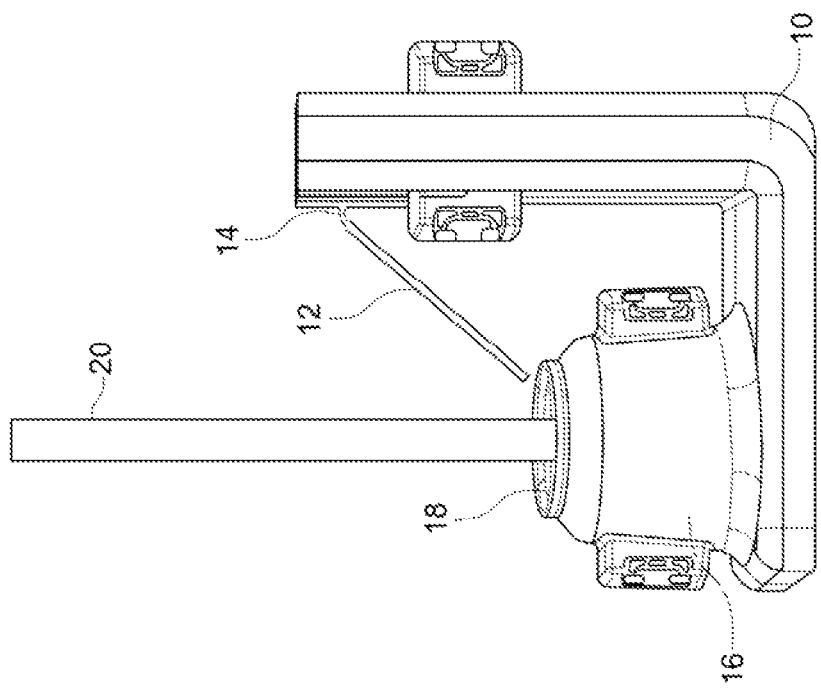
FIG. 2 illustrates the isolating flap in the access position.

FIGS. 1 and 2 show a part of the battery system including an isolating flap 12 and an isolation member or isolator 10 carrying the isolating flap 12 at a vertical section thereof, the isolator 10 thus forming a carrying part for the isolating flap 12. The isolating flap 12 may be mounted to or on the isolator 10 pivotably via an integral hinge 14. The isolator 10 may further include a horizontal section including a receptacle 16 for a busbar screw connection, the receptacle 16 having an opening 18 for accessing the busbar screw connection. The busbar screw connection may be a high voltage component that carries a high voltage under operation conditions due to its electrical connection to the HV board net and thus the HV traction battery of the electric vehicle.

The isolating flap 12 may be pivotable via the integral hinge 14 relative to the isolator 10, e.g., between a blocking position (in which the isolating flap 12 blocks access to the busbar screw connection) and an access position (in which the isolating flap 12 allows access to the busbar screw connection).

As seen in FIG. 1, the isolating flap 12 may be in the blocking position, e.g., in which the isolating flap 12 blocks access to the opening 18 of the receptacle 16 and blocks access to the busbar screw connection. The isolating flap 12 may be preloaded into the blocking position with a force of more than 1 N (Newton). In the blocking position, the isolating flap 12 may cover the opening 18 and thus may help protect a person from accidentally coming into contact with the busbar screw connection. To overcome the preloading, e.g., to move the isolating flap 12 to the access position, one would have to apply a force of greater than 1 N to the isolating flap 12 at a right angle with respect to an extension plane of the isolating flap 12. In an implementation, accidentally touching the isolating flap 12 e.g., with the finger of a hand, may not apply a force sufficient to pivot the isolating flap 12 from the blocking position to the access position.

As seen in FIG. 2, the isolating flap 12 may be in the access position, e.g., in which the isolating flap 12 allows access to the opening 18 of the receptacle 16 and access to the busbar screw connection. The isolating flap 12 may be pivoted into the access position by, e.g., a screwdriver 20, via which a force of larger than 1 N may be applied at a right angle to the isolating flap 12, so that the isolating flap 12 may be pushed away (e.g., downwardly or inwardly) thereby pivoting towards the receptacle 16 and towards the busbar screw connection. With the screwdriver 20, the busbar screw connection may thus be reached and serviced. When removing the screwdriver from the busbar screw connection and the receptacle 16, the isolating flap 12 may automatically enter or return to the blocking position again due to the preloading.

In an implementation, the isolating flap may allow easy access to the busbar screw connection while still allowing for sufficient protection against accidental contact. In contrast to separate or loose touch protection elements, e.g., an isolating cap the covering the busbar screw connection, the isolating flap according to an embodiment may not need to be (e.g., completely) removed from the busbar screw connection to allow access to the busbar screw connection. In an implementation, the mounted isolating flap may remain connected to the isolator, and may only pivot away so as to allow access to the busbar screw connection. This allows for easier access to the busbar screw connection and also prevents accidental loss of the touch protector. In an implementation, no manually removable touch protection element, e.g., an isolating cap, may be used. In an implementation, the isolating flap may fulfil not only the IPXXB standard, but also the IPXXD standard, e.g., due to requiring more than 1 N to move to the access position.

By way of summation and review, in electric vehicles, the battery system may include a high voltage battery formed of battery packs, and the high voltage battery may work as a traction battery for the propulsion of the electric vehicle. Such high voltages may exceed 60 V. The high voltage battery and further electrical components connected to the high voltage battery, e.g., components of a high voltage board net of the vehicle, may carry voltages high enough to endanger humans. For example, an operator of the vehicle or a service person could get injured if one comes into contact with a live part under high voltage.

Battery systems for electric vehicles may include touch protection elements that help protect a user from accidentally coming in contact with the high voltage component.

Many such high voltage components may have to be accessible for the user, e.g., for maintenance or service reasons, which may necessitate the removal of the respective touch protection element. Therefore, for such high voltage components the touch protection elements may be removable and reusable so that they may be attached to the high voltage component again after the maintenance procedure is finished.

Touch protection elements may be applied manually to the high voltage carrying component. The high voltage component may include, e.g., a busbar screw connection, and the touch protection element may include a separate/loose isolating cap that can be put over the screw connection. To provide access to the busbar screw connection (e.g., to screw or unscrew the connection) the isolating cap may be removed manually. Also, even if the screwing process itself were to be done in an automated manner, the subsequent application of the isolating cap may need to be done manually by an operator. Some touch protections for screwing connection may only proof according to the IPXXB standard. Furthermore, this may be a safety relevant process and documentation of manual processes may be critical. Also, there may be a risk of losing the touch protection, especially in case of service.

Some other high-voltage batteries may include multiple battery modules with interfaces covered with flaps, wherein when a connector is moved towards one of the interfaces the flaps may be pushed in an open position by the connector away from the interface, thereby providing an opening in between the flaps so that the connector can access the interface. Such a construction may be complex and error-prone, e.g., because of the specific movement of the flaps away from the interface.

One or more embodiments may provide a battery system for an electric vehicle having sufficient protection from high voltage components while still allowing, in a simple manner, access to such components.

One or more embodiments may provide a battery system for an electric vehicle that includes a high voltage component and a touch protector for protecting a user from accidentally contacting the high voltage component.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system for an electric vehicle, the battery system comprising:
    at least one high voltage component;
    an isolator, the isolator including an access opening; and
    a touch protector, the touch protector being configured to protect a user from accidentally contacting the at least one high voltage component,
    wherein the touch protector includes a pivotably mounted isolating flap, the isolating flap being pivotable between:
        a blocking position in which the isolating flap blocks access to the at least one high voltage component, and
        an access position in which the isolating flap allows access to the at least one high voltage component,
    wherein the isolating flap is configured such that the isolating flap is pivotable towards the at least one high voltage component from the blocking position to the access position in response to application of a predetermined force to the isolating flap, and
    wherein the access opening is an opening configured to accommodate insertion of a force applicator.

2. The battery system as claimed in claim 1, wherein the isolating flap is preloaded in the blocking position.

3. The battery system as claimed in claim 2, wherein the predetermined force is a force of more than 1 N.

4. The battery system as claimed in claim 1, wherein the isolating flap is integrally mounted on the isolator.

5. The battery system as claimed in claim 4, further comprising an integral hinge, wherein the isolating flap is mounted on the isolator via the integral hinge.

6. The battery system as claimed in claim 4, wherein the access opening is:
    covered by the isolating flap when the isolating flap is in the blocking position, and
    uncovered by the isolating flap when the isolating flap is in the access position.

7. The battery system as claimed in claim 1, wherein the battery system includes a high voltage traction battery for the electric vehicle.

8. An electric vehicle comprising the battery system as claimed in claim 1.

9. The electric vehicle as claimed in claim 8, wherein the isolating flap is preloaded into the blocking position.

10. The electric vehicle as claimed in claim 9, wherein the predetermined force is a force of more than 1 N.

11. The electric vehicle as claimed in claim 8, wherein:
    the isolating flap is integrally mounted on the isolator.

12. The electric vehicle as claimed in claim 11, wherein:
    the battery system further includes an integral hinge, and
    the isolating flap is mounted on the isolator via the integral hinge.

13. The electric vehicle as claimed in claim 11, wherein the access opening is:
    covered by the isolating flap when the isolating flap is in the blocking position, and
    uncovered by the isolating flap when the isolating flap is in the access position.

14. The electric vehicle as claimed in claim 8, wherein the battery system includes a high voltage traction battery for the electric vehicle.

15. A battery system for an electric vehicle, the battery system comprising:
    at least one high voltage component;
    an isolator, the isolator comprising a receptacle having an access opening; and
    a touch protector, the touch protector being configured to protect a user from accidentally contacting the at least one high voltage component,
    wherein the touch protector includes a pivotably mounted isolating flap, the isolating flap being pivotable to the isolation member between:
        a blocking position in which the isolating flap blocks access to the at least one high voltage component, and
        an access position in which the isolating flap allows access to the at least one high voltage component,
    wherein the isolating flap is configured such that the isolating flap is pivotable towards the at least one high voltage component from the blocking position to the access position in response to application of a predetermined force to the isolating flap.

16. The battery system as claimed in claim 15, wherein the isolating flap is integrally mounted on the isolator.

17. The battery system as claimed in claim 16, further comprising an integral hinge, wherein the isolating flap is mounted on the isolator via the integral hinge.

18. The battery system as claimed in claim 15, wherein the access opening is an opening configured to accommodate insertion of a force applicator.

* * * * *